(12) United States Patent
Becker

(10) Patent No.: US 10,513,047 B2
(45) Date of Patent: Dec. 24, 2019

(54) MEAT PROCESSING APPARATUS AND METHODS

(71) Applicant: Andrew Becker, Pleasant Prairie, WI (US)

(72) Inventor: Andrew Becker, Pleasant Prairie, WI (US)

( * ) Notice: Subject to any disclaimer, the term of this patent is extended or adjusted under 35 U.S.C. 154(b) by 35 days.

(21) Appl. No.: 14/593,484

(22) Filed: Jan. 9, 2015

(65) Prior Publication Data
US 2016/0199995 A1 Jul. 14, 2016

(51) Int. Cl.
*A22C 17/00* (2006.01)
*B26D 7/06* (2006.01)
*B26D 3/18* (2006.01)
*B27B 25/10* (2006.01)

(52) U.S. Cl.
CPC ........ *B26D 7/0608* (2013.01); *A22C 17/0006* (2013.01); *B26D 3/18* (2013.01); *B27B 25/10* (2013.01)

(58) Field of Classification Search
CPC .... A22C 17/0006; B26D 3/18; B26D 7/0608; B27B 25/10
See application file for complete search history.

(56) References Cited

U.S. PATENT DOCUMENTS

| | | | | |
|---|---|---|---|---|
| 597,950 A * | 1/1898 | Buck | ...................... | B27B 25/10 83/409 |
| 1,975,032 A * | 9/1934 | Winfree, Jr. | ......... | B26D 7/0616 83/155 |
| 2,585,957 A * | 2/1952 | Meeker | ................... | B23D 55/02 83/168 |
| 2,747,633 A * | 5/1956 | Burlin | .................... | B26D 1/143 83/167 |
| 3,072,164 A * | 1/1963 | Ramirez | ................. | B27B 33/06 83/661 |
| 4,208,936 A * | 6/1980 | Whitehouse | ............. | B26D 1/46 83/713 |
| 4,345,498 A * | 8/1982 | Best | ..................... | B26D 7/0616 312/258 |
| 5,041,056 A * | 8/1991 | Hutton | ............... | A22C 17/0006 30/380 |
| 5,626,067 A * | 5/1997 | Lothe | ..................... | B26B 29/06 269/289 R |

\* cited by examiner

*Primary Examiner* — Kenneth E Peterson
*Assistant Examiner* — Liang Dong
(74) *Attorney, Agent, or Firm* — Hinshaw & Culbertson LLP

(57) ABSTRACT

A meat saw pusher device is provided, for use with a table type meat saw machine. The device comprises a pusher panel disposed in sliding cooperation with a feed channel, the feed channel defined by a structure preferably having a smooth, flat bottom surface to promote ease of sliding across a smooth flat table of a meat saw machine. Preferably, the device includes a feed handle mounted for advancing the pusher panel, and a cutting and return stroke handle mounted to one or both sides of the channel structure for moving the entire device laterally in cutting and return stroke directions. A guide panel extending below a base of the channel structure cooperates with an edge of the meat saw table to guide a lateral cutting stroke movement of the device.

13 Claims, 5 Drawing Sheets

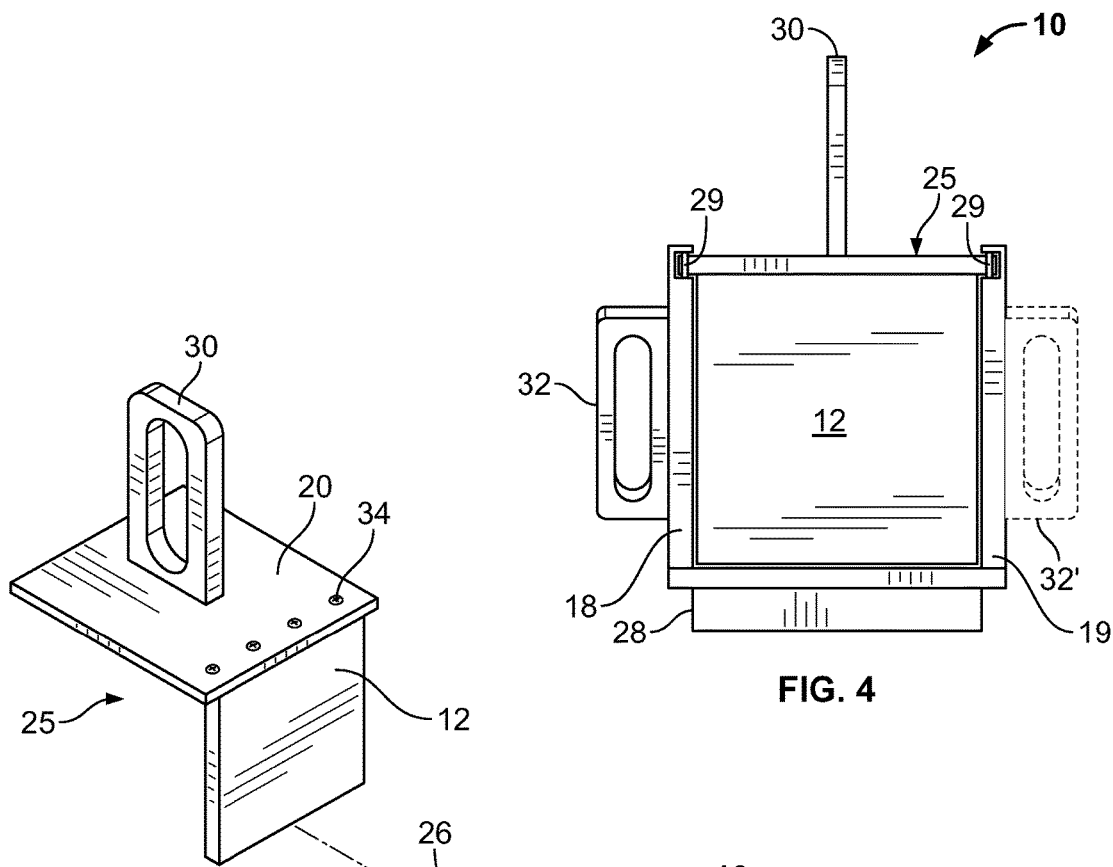
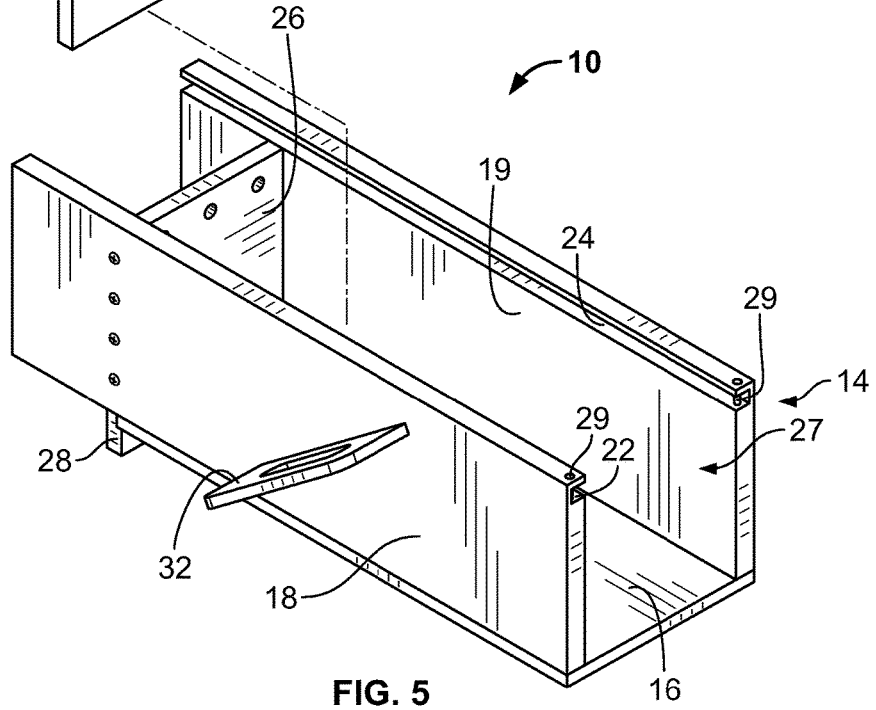
FIG. 4
FIG. 5

MEAT PROCESSING APPARATUS AND METHODS

FIELD OF THE INVENTION

The present invention relates to meat processing equipment and methods. More particularly, it relates to a pusher device for use with a meat saw and to a combination of the pusher device and a meat saw operating in conjunction with the pusher device.

BACKGROUND

Speed, efficiency, and product consistency are crucial to a successful meat processing enterprise. Thus, a common piece of equipment in a meat processing facility is a meat saw, typically a powered, table mounted band saw with an adjustable fence for setting the thickness of cuts. Existing meat saws commonly employ a movable carriage assembly comprising a tray mounted on a track for side-to-side cutting stroke movement parallel to the saw blade and fence. A pusher plate slidingly mounted to the tray is pushed forward to advance meat on the tray against the fence before each cutting stroke. The pusher plate provides a simple and convenient way to support meat from behind during a lateral cutting stroke with multiple safeguards against an operator inadvertently cutting his or her hands, including a stop mechanism that prevents the plate from crossing the plane of the saw blade, in addition to the plate itself serving as a guard or obstruction standing between the operator's hand and the blade. Typical examples of such a meat saw are the BIRO® Models 1433 and 1433FH (Fixed Head) Meat Cutters available from the Biro Manufacturing Company.

However, the typical meat saw design described above suffers from a number of shortcomings. For example, the lateral mobility of the carriage itself imposes limitations on its size, as it would be undesirable for the carriage to intermittently protrude beyond the profile of the saw table on every stroke, either jutting into or limiting available space for walking pathways on the facility floor. Consequently, the carriage tray is typically made to have a width substantially less than that of the whole device, with the attendant disadvantage of limited working surface space for manipulating the meat before or after cutting. Additionally, the tracks used to mount the carriage are susceptible to soiling of interior corners, grooves or other hard to reach and clean areas, as is the corresponding mating structure of the carriage itself. Furthermore, the mating track structure adds to the cost and complexity of the device.

A need therefore exists for an improved meat saw apparatus with an elegant and practical design that provides the advantages of control and operator safety provided by existing carriages without limitations on available working/counter space, with improved ease of cleaning, and simpler manufacture.

SUMMARY OF THE INVENTION

According to an aspect of the present invention, a meat saw pusher device is provided for use with a table type meat saw machine. The pusher device comprises a substantially vertically oriented pusher panel slidably mounted within a housing defining a feed channel, for feeding meat to a meat saw from the feed channel. The structure of the feed channel includes a smooth bottom panel that provides a smooth bottom surface of the pusher device, for resting on and sliding across a smooth, horizontal tabletop surface of the meat saw machine, and pair of parallel side panels affixed to opposite sides of the bottom panel. Thus, the channel structure defines a feed channel having a closed bottom and sides, and an open front end. The pusher panel has a height and width approximately equal to those of the feed channel, thus defining a closed back end of the feed channel opposite the open front end.

Sliding the pusher panel in a forward feed direction shortens the channel and forces meat forward, while sliding the pusher panel backward in a return direction lengthens the channel to make more room for loading of meat. The feed and return directions are substantially normal to a forward facing pushing surface of the pusher panel and aligned with a longitudinal dimension of the feed channel.

A guide panel affixed to the channel structure and extending below said bottom surface of the pusher device comprises a substantially planar, smooth guide surface configured to slide along a straight horizontal edge of the meat saw machine extending parallel to a saw blade of the meat saw machine. Typically, this edge of the machine would be the edge of the table on which the pusher device rests, though any suitable structure having an effective stiffness, position relative to the machine and saw blade, and shape adapted to guide a straight lateral movement of the pusher device through a cutting stroke may substitute for a table edge. The guide surface is oriented transversely with respect to the feed channel, but does not necessarily have to be permanently held perpendicular thereto. In alternative embodiments, the guide surface may be fixed at a different transverse angle for making diagonal cuts with respect to the feed and return directions, or may be adjustable to a selected angle for making angled cuts, such as to adapt to the grain orientation of the meat being fed from the pusher device, for example.

In one embodiment, the pusher device further comprises a backstop panel affixed to the channel structure and disposed to provide a hard stop to movement of the pusher panel in the return direction, thus defining a home position of the pusher panel. In this case, the guide panel may advantageously be comprised in the backstop panel, which may simplify the device construction while at the same time the connection of the guide panel to the base panel and side panels may provide enhanced structural rigidity to the guide panel as compared to a guide panel extending only below the base panel.

In another embodiment, a pusher mounting panel, preferably having a pusher handle affixed thereto, is perpendicularly affixed to the pusher panel and slidingly connected to the feed channel to provide sliding movement of the pusher panel in the feed and return directions. An additional handle may be provided on one or both side panels, preferably oriented with an upward incline towards the front of the device for comfortable gripping by a user standing behind the device, for pushing the channel structure across the meat saw table in the cutting stroke direction, a return stroke direction generally opposite to the cutting stroke direction, and in directions for moving the guide surface toward and away from the guiding edge of the table or other guiding structure of the meat saw machine.

If the pusher device includes both the pusher mounting panel and the backstop panel described above, the bottom surface of the pusher mounting panel may be aligned approximately coplanar with a top surface of the backstop panel to slide just over the top of the backstop panel as the pusher panel is fully withdrawn to the home position. In this case, an air vent may be formed in at least one of the panels to facilitate further movement of the pusher panel in the return direction when pusher mounting panel bottom surface overlaps backstop panel top surface, as otherwise a shrinking volume of air enclosed between the pusher panel and the backstop panel, the bottom panel and the pusher mounting panel, and the two side panels would become pressurized and make fully withdrawing the pusher panel too difficult.

Preferably, the various panels of the device are composed of a stiff, nonstick, low density, solvent resistant (to facilitate cleaning) panel material, which does not absorb meat residue. One suitable panel material is polyethylene.

In another aspect of the invention, a method is provided for using a meat saw apparatus substantially as described above to form meat cubes. The method comprises starting a motor of the meat saw blade of a meat saw machine, placing the pusher device on the tabletop surface of the meat saw machine, aligning the guide panel against a straight horizontal edge of the meat saw machine extending parallel to the meat saw blade, placing meat in the feed channel, advancing the pusher panel in the feed direction to push a front portion of the meat past the open feed channel end and against the fence, and sliding the pusher device on its bottom surface across the tabletop surface of the meat saw machine and the guide panel along the edge of the meat saw machine in a cutting stroke direction parallel to the meat saw blade to pass the meat saw blade through the front portion of the meat. The cutting stroke should of course be executed last, but the previous actions may be performed in any order, and are not necessarily discrete "steps" performed one at a time; rather, two or more of the actions may be performed simultaneously.

To form meat cubes, first a plurality of slices are formed by repeating the advancing and cutting stroke steps described above. The steps of advancing the pusher panel and sliding the pusher device in the cutting stroke direction are repeated to slice the meat into a plurality of pieces of substantially equal thickness. Next, the slices are stacked and fed to the saw again to form cords of substantially square cross sections by cutting perpendicularly to the cut surfaces of the slices. The meat cords may then be placed in the feed channel, aligned longitudinally therewith, and fed again to the saw blade to form cubes. If desired or necessary due to the size of an initial slab of meat not being accommodated by the height, width, and/or maximum length of the feed channel, an operator may quite readily perform the first and second series of cuts freehand without using the pusher device as a guide, while advantageously using the device for the third series of cuts, when it is most needed to prevent lateral sliding or tumbling of cords away from the bundle being fed to the saw blade. In this regard, the elegant cooperation of the smooth bottom surface of the pusher device with a smooth, broad, flat meat saw table, free of ribs, channels, or other such guide features, provides a convenient benefit—the same table is ideally suited to freehand manipulation of a slab of meat directly thereon, where the meat will easily slide in any direction, and avoid leaving traces of residue in tight spaces.

BRIEF DESCRIPTION OF THE DRAWINGS

FIG. 4 is a front elevation view of the meat saw pusher device shown in FIG. 1A.

FIG. 5 is a partially exploded view of the meat saw pusher device shown in FIG. 1A.

DETAILED DESCRIPTION OF THE INVENTION

Figure 1A:
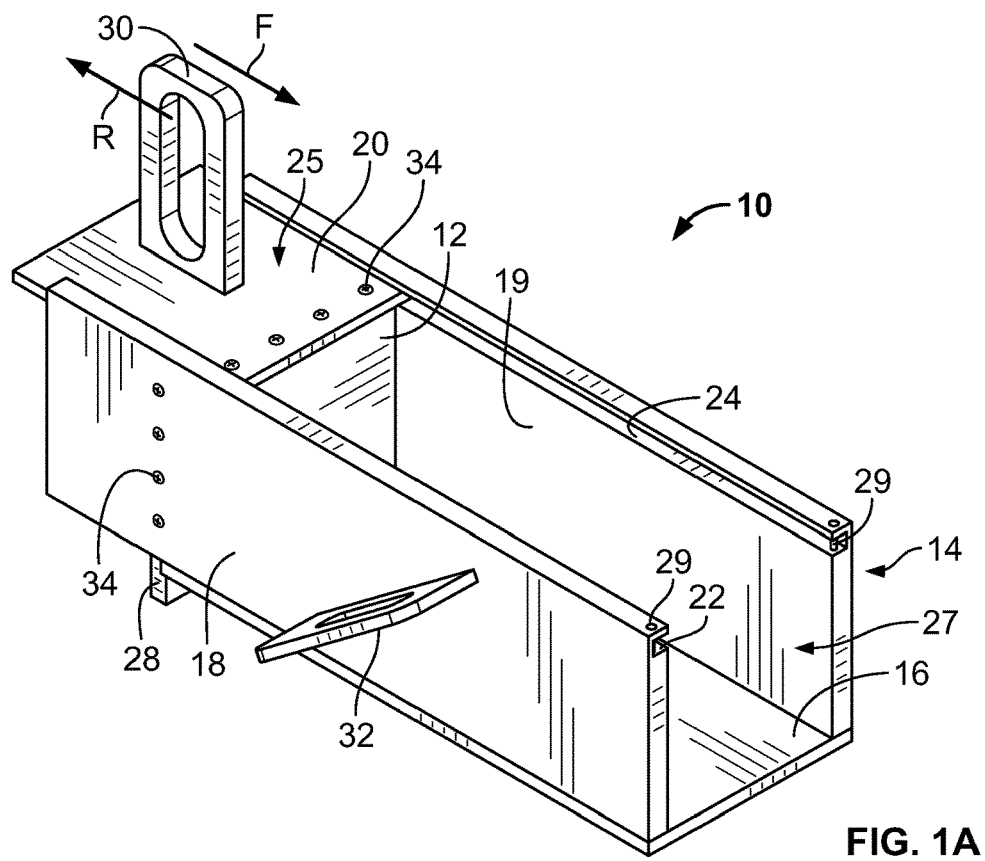
FIG. 1A is a top perspective view of a meat saw pusher device according to the invention.
Figure 1B:
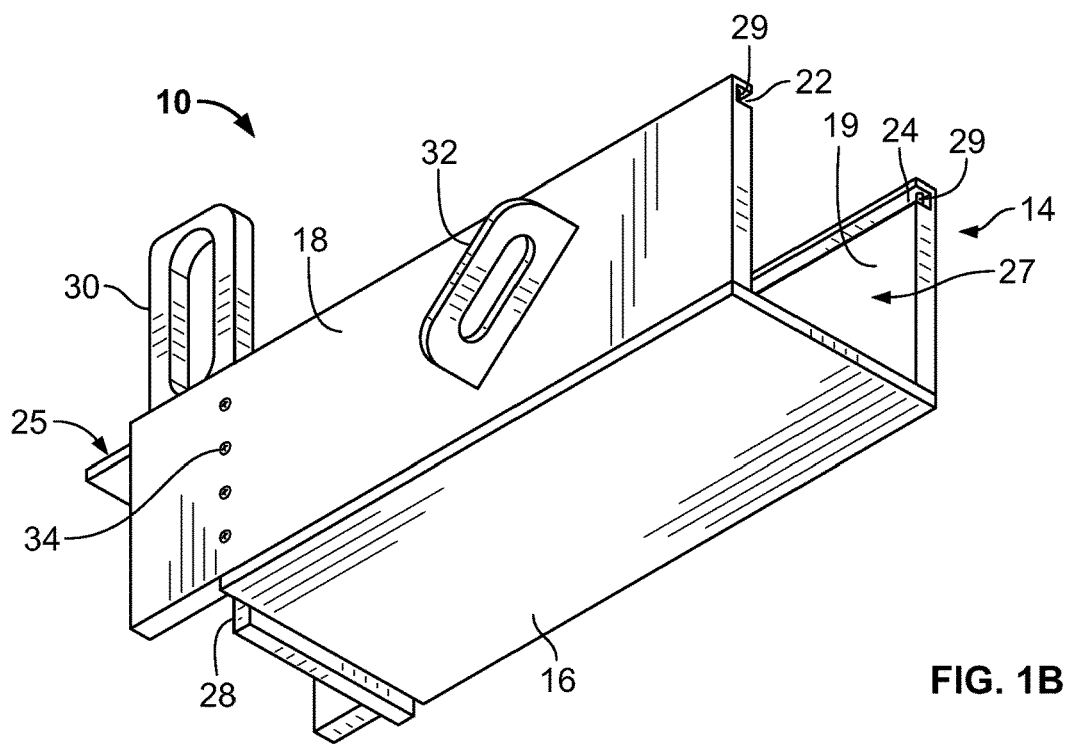
FIG. 1B is a bottom perspective view of the meat saw pusher device shown in FIG. 1A

With reference to the accompanying drawings, preferred embodiments of a meat saw pusher device and a meat saw apparatus incorporating the pusher device and a meat saw machine adapted for use in conjunction with the pusher device are described below. Additionally, methods of using the meat saw apparatus of the invention to process meat are described and illustrated.

Turning to FIGS. 1A-5, a meat saw pusher device 10 is illustrated. Pusher device 10 includes a vertically oriented pusher panel 12 slidingly mounted in an integral feed channel structure 14 for longitudinal movement along the channel in a forward, feed direction F and a backward, return direction R as designated in FIG. 1A. Feed channel structure 14 in turn includes a bottom panel 16 to which opposed, parallel right and left side panels 18 and 19 are affixed at right angles. Bottom panel 16 includes a smooth, flat bottom surface, as shown in FIG. 1B. Pusher panel 12 is affixed to a pusher mounting panel 20, which is in turn slidably retained between side panels 18 and 19 by its side edges being seated in opposed longitudinal sliding slots 22 and 24 of the respective side panels 18 and 19. Shown in FIG. 5 is an exploded view illustrating separately the two essential integral structures of pusher device 10, namely, channel structure 14 and a pusher structure 25 that includes pusher panel 12 and pusher mounting panel 20.

A backstop panel 26 defines a rearmost, home position of pusher panel 12, at which pusher panel 12 abuts backstop panel 26 and can move no further in return direction R. In FIG. 1A, pusher panel 12 is shown at or near its home position. Backstop panel 26 also serves to provide structural rigidity and support to channel structure 14 by being attached at its opposite side ends to side panels 18 and 19. For additional support, a back end of bottom panel 16 may optionally be attached to backstop panel 26 at a lower region of the latter (not shown).

Serving as pusher panel stops at the front end of device 10 are stop pins 29 connected to side panels 18, 19 and disposed in respective slots 22, 24 to obstruct forward movement of pusher panel 12 in feed direction F past a position close to an open front end 27 of channel structure 14.

Comprised in the lowermost portion of backstop panel 26 is a guide panel 28. The incorporation of guide panel 28 into backstop panel 26 advantageously simplifies the construction of the device. However, though not illustrated as such, guide panel 28 may alternatively be a separate member, which may for example allow for guide panel 28 to be adjustable to different angular orientations or longitudinal positions as desired. One benefit of such adjustability may be to permit adjusting the cutting angle to optimally address the grain of a cut of meat.

Figure 2:
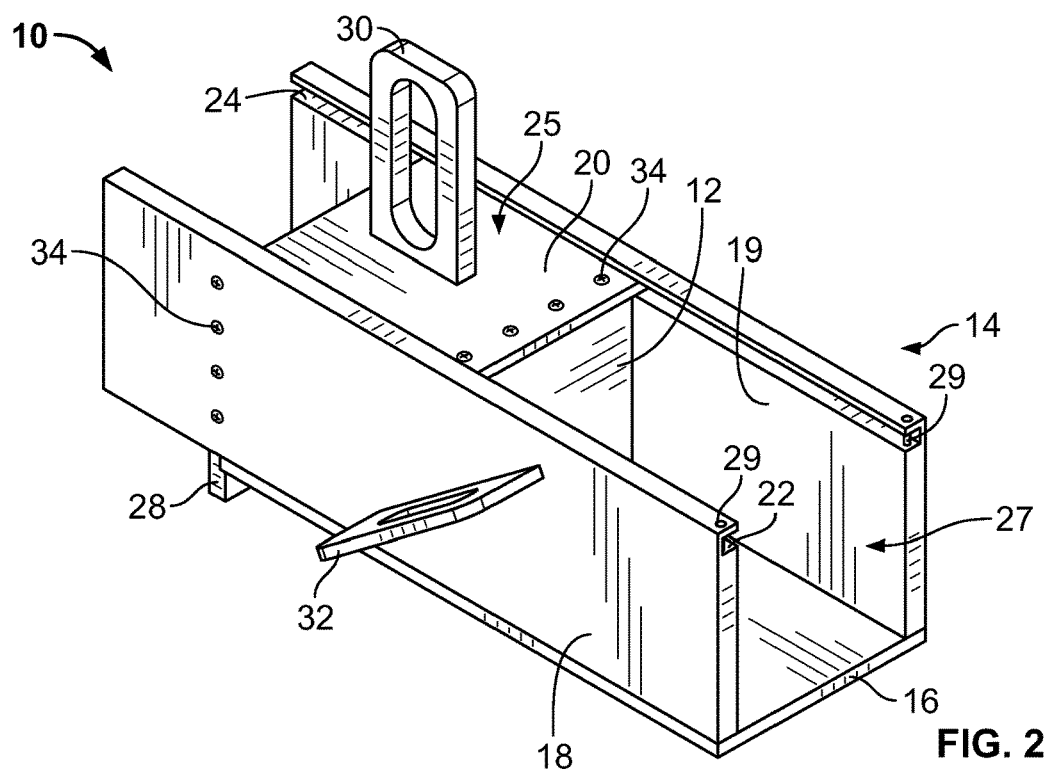
FIG. 2 is a top perspective view of the meat saw pusher device shown in FIG. 1A, illustrating another position thereof.
Figure 3:
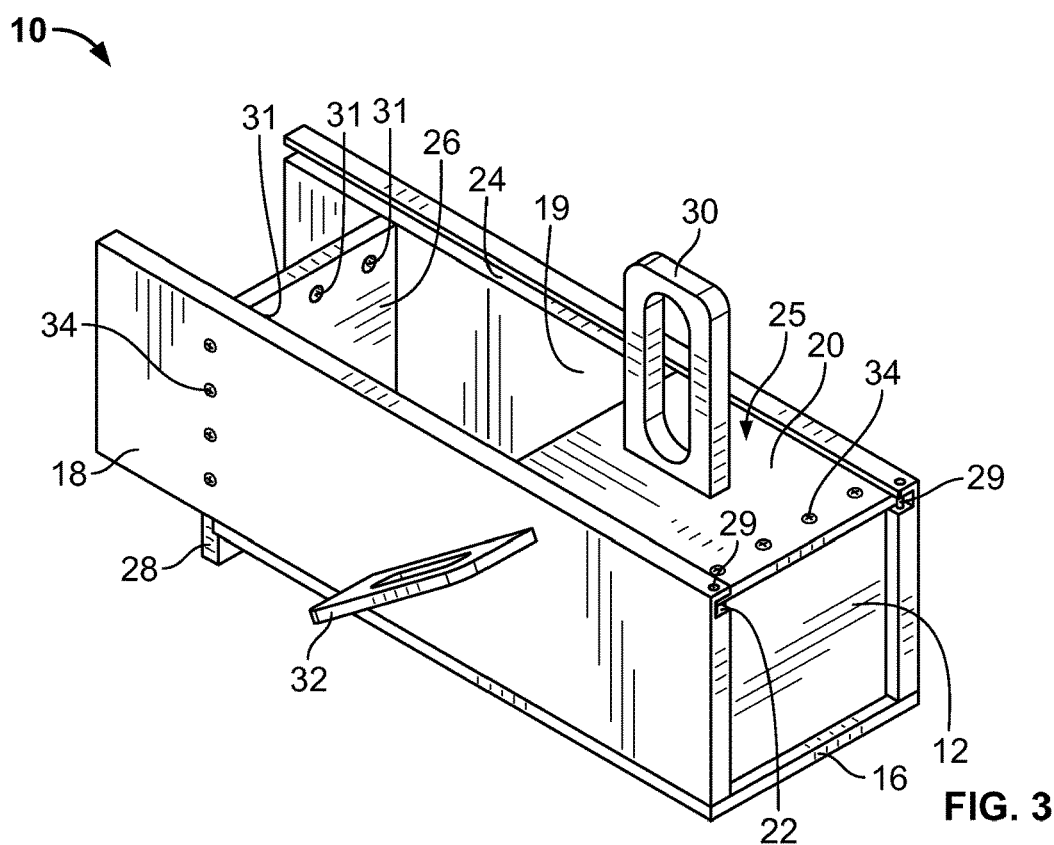
FIG. 3 is a top perspective view of the meat saw pusher device shown in FIG. 1A, illustrating still another position thereof.

With reference to FIGS. 2 and 3, it will be noted that a bottom face of pusher mounting panel 20 is aligned substantially coplanar with a top face of backstop panel 26 (see FIG. 3), so that when pusher mounting panel 20 crosses the front plane of backstop panel 26 when moving in the return direction, a position as shown in FIG. 2 is reached, where a volume of air is essentially trapped in a box defined between side panels 18 and 19, between pusher panel 12 and backstop panel 26, and between pusher mounting panel 20 and bottom panel 16. To move pusher panel 12 farther in the return direction from this position, then, would tend to meet with resistance as the boxed in air is compressed, but for the presence of air vents 31 formed in backstop panel 26. Air vents may alternatively be formed in one of the other panels, but forming them in backstop panel 26 is preferred, because they are positioned always to be in communication with the volume of boxed in air. In addition, unlike forming air vents in pusher panel 12 instead where they will also always be in communication with the boxed in air, forming air vents 31 in backstop panel 26 keeps them from being obstructed by being directly exposed to meat or meat residue, which would be detrimental to their effectiveness while making pusher device 10 more difficult to clean.

Finally, pusher device 10 includes handles 30, 32 to facilitate manual operation. Handle 30 is illustrated in the drawings as attached (by suitable means not visible in the Figures, which may for example be countersunk screws) to pusher mounting panel 20 for advancing and withdrawing pusher panel 12 in respective feed and return directions F and R. Meanwhile, handle 32, attached by suitable means to right side panel 18, provides for manual movement of the entire device, its shape adapted to grasping and pulling as well as for pushing, the former being particularly useful for returning device 10 to a "ready" position for the next cut, and the latter for pushing device 10 through a cutting stroke in a lateral direction transverse to the channel of device 10. A left handed version of pusher device 10 may include a handle 32' attached to left side panel 19, illustrated as a phantom feature in FIG. 4, in lieu of handle 32, or both handles may be included to provide an ambidextrous pusher device, for use in conjunction with a left handed or reversible meat saw.

In a preferred embodiment, panels 12, 16, 18, 19, 20, and 26 are made of a low cost, durable, and stiff or rigid panel material, typically a polymer, having good chemical resistance, such as to solvents and disinfectants for cleaning meat and other residue from surfaces of pusher device 10. For example, the panels may be cut from stock polyethylene material (such as HDPE) referred to in the industry as "poly board." Stainless steel could also be expected to perform adequately, though its weight and cost would generally make it less desirable than a suitable polymer. Countersunk screws 34 provide a convenient and effective means of attaching panels 12, 20 and panels 16, 18, 19, and 26 to one another to assemble pusher device 10. Other suitable fasteners or fastening operations may be substituted without departing from the scope and spirit of the invention, including but not limited to bolts, rivets, adhesives, soldering/welding, press/interference fit dowels or mating features. Alternatively, in lieu of attaching panels together, the structures thus assembled may instead be integrally molded or otherwise formed as one piece.

Figure 6:
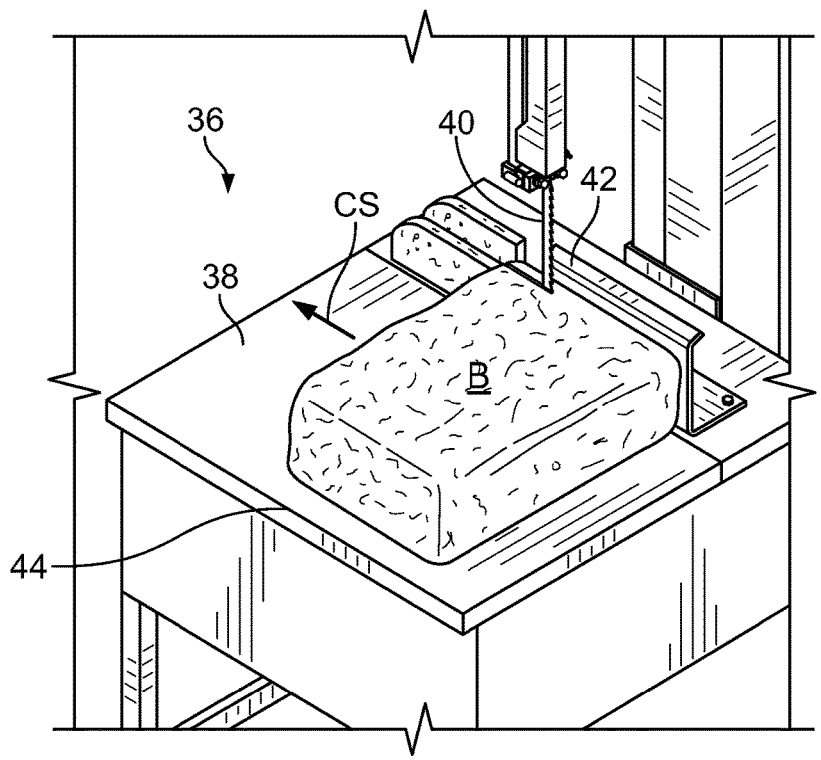
FIG. 6 is a perspective view of a meat saw apparatus for use in conjunction with the meat saw pusher device shown in FIG. 1A, illustrating part of a meat cutting method according to the invention.
Figure 7:
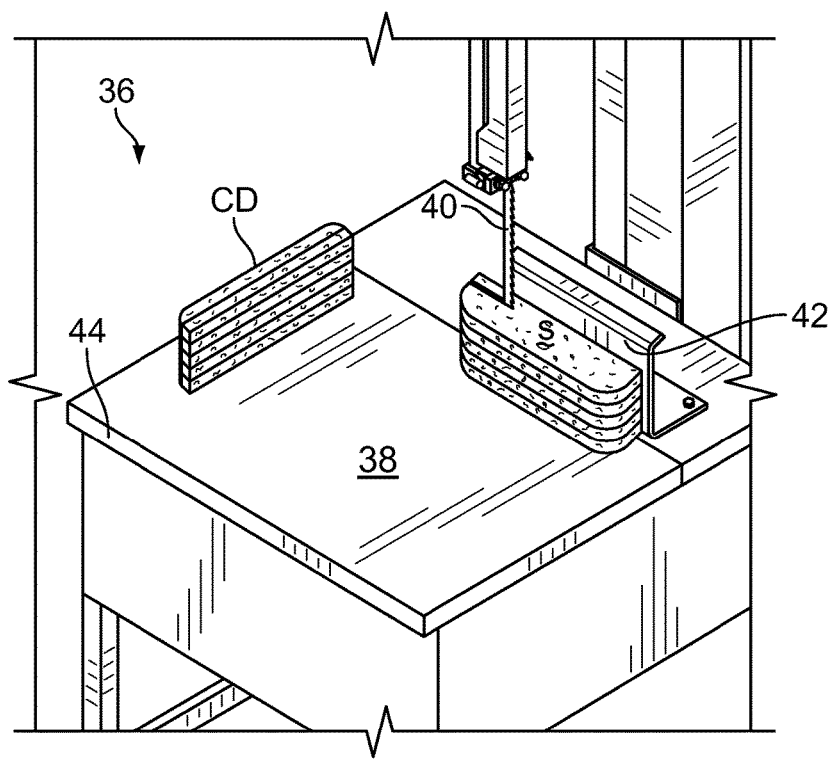
FIG. 7 is a perspective view of the meat saw apparatus shown in FIG. 6, illustrating another part of a meat cutting method according to the invention.

An illustrative meat processing method according to the invention will now be described, with reference to steps illustrated in FIGS. 6-8. Turning to FIGS. 6 and 7, an initial step of cutting slices S from a block of meat B using a meat saw apparatus 36 is illustrated. One advantage of the use of a pusher device 10 according to the invention is immediately highlighted: Because pusher device 10 is able to function by sliding its broad, smooth bottom surface across a smooth table top surface, its guide panel 28 being sufficient to align and guide its cutting stroke movements, pusher device 10 can be used in conjunction with a meat saw apparatus having a broad, flat, stationary front tabletop 38 provided in front of its saw blade 40 and fence 42. Pusher device 10 is thus easily removed or pushed aside as desired, clearing front tabletop 38 for use in forming initial cuts in meat block B by simply placing meat block B directly on tabletop 38 against fence 42, and sliding it repeatedly in a cutting stroke direction CS. Turning to FIG. 7, slices S thus formed may then be stacked face to face on their cut faces, and the stack moved against fence 42 and slid back and forth across tabletop 38 to cut meat slices S into meat cords CD. It may often be most convenient and practical to perform the portion of the method illustrated in FIGS. 6 and 7 "freehand," in the sense of not using a movable guide to push, align, or support the meat for the first two series of cuts, but only one's hands, the stationary tabletop 38, and stationary fence 42. Thus, again, it is particularly advantageous that device 10 is adapted for use in conjunction with a broad, flat tabletop that provides a convenient support surface for manipulation of meat by hand when device 10 is removed or moved aside.

Once meat cords CD have been formed, they are gathered into an aligned bundle and placed within channel structure 14 of pusher device 10 resting on tabletop 38. While it is easy enough to cut a meat block B into slices S and a stack of meat slices S into cords CD by hand, cutting a bundle of cords CD by hand would present difficult challenges, requiring a human operator to manually slide the bundle while at the same time attempting to prevent the cords in the bundle from twisting, bending, turning, or toppling out of alignment. Advantageously, side panels 18, 19 of pusher device 10 serve to passively maintain alignment of cords CD, freeing an operator's hands to advance cords CD, perform cutting strokes, and return cords CD to alignment with fence 42 following each cutting stroke. This also enhances safety.

Figure 8:
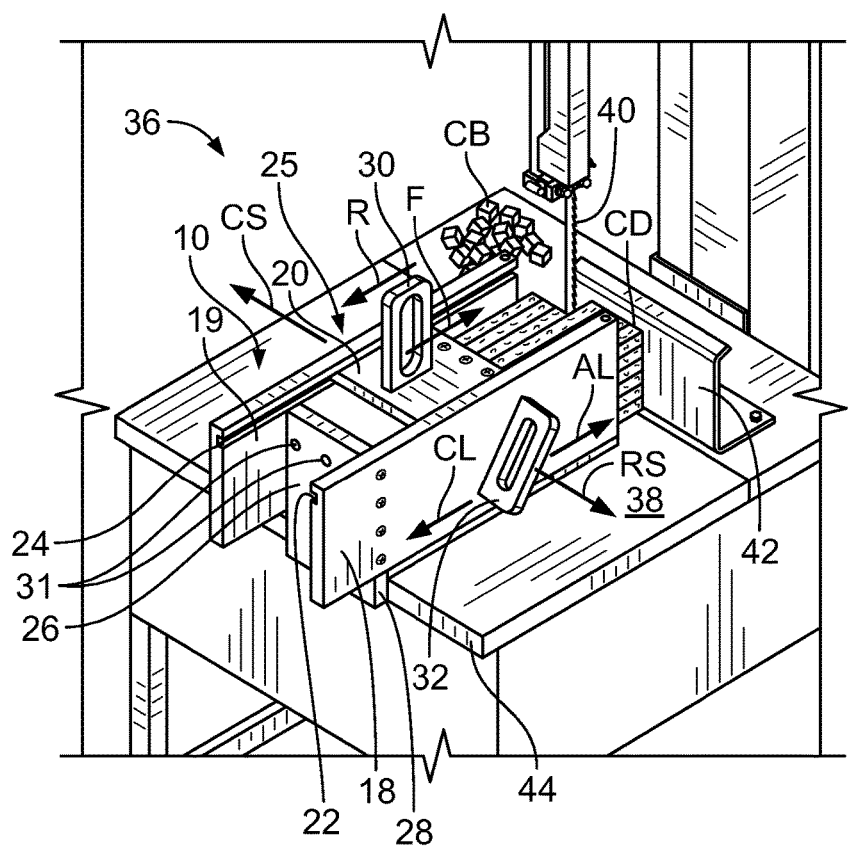
FIG. 8 is a perspective view of the pusher device shown in FIG. 1A deployed for use with the meat saw apparatus shown in FIG. 6 in performing yet another part of a meat cutting method according to the invention.

Finally, turning to FIG. 8, pusher device 10 is shown resting on tabletop 38, captured in mid cutting stroke. Guide panel 28 is aligned with an edge 44 of tabletop 38 (which may, instead of a tabletop edge, be a straight edge of any suitable structure of meat saw apparatus 36 for aligning and guiding guide panel 28 through a cutting stroke movement), and pusher structure 25 is advanced in the feed direction to move the front ends of meat cords CD against fence 42. Finally, a series of cutting strokes in direction CS is again performed to cut meat cubes CB from meat cords CD. Following each cutting stroke before the very last cutting stroke, a human operator moves pusher device 10 in the return stroke direction designated RS to return meat cords CD to the cutting side of saw blade 40. If necessary, the operator may pull pusher device 10 backward in a clearance direction designated CL to clear the ends of any cords CD that may have slipped forward during the cutting stroke from running into the dull edge of saw blade 40 during the return stroke. Once clear of saw blade 40, the operator returns guide panel 28 to alignment with tabletop edge 44 by pushing pusher device 10 forward in an alignment direction designated AL, and again advances pusher structure 25 to move the front ends of meat cords CD against fence 42, which should also realign any cords CD which slipped forward during the previous cutting stroke. Thus, it will be noted that additional freedom of movement of pusher device 10 in clearance and alignment directions provides yet another significant advantage over track mounted meat carriages of the prior art, which require an operator to realign any meat pieces that have slipped forward by hand to clear them of the dull edge of the saw blade for a return stroke, as the prior art carriages can only be moved laterally.

While the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A meat saw apparatus comprising:
a meat saw machine having a flat, horizontal tabletop surface for freehand manipulation of a slab of meat directly thereon, the tabletop surface being in fixed relationship to the meat saw; and
a meat saw pusher device configured for manual use with the meat saw machine, the meat saw pusher device including a substantially vertically oriented pusher panel; a bottom panel comprising a bottom surface of the pusher device configured to rest on and slide across the tabletop surface during use of the pusher device; a pair of opposed side panels affixed to the bottom panel in a parallel orientation, the side panels and the flat bottom panel combining to form an integral channel structure, the channel structure defining a feed channel having a closed bottom and sides, and the pusher panel having a width equal to a width of the feed channel, being positioned within the feed channel to define a closed back end of the feed channel opposite an open front end of the feed channel, and being slidingly mounted in the feed channel for sliding in a forward feed direction and a backward return direction, said feed and return directions being substantially normal to a forward facing pushing surface of the pusher panel and aligned with a longitudinal dimension of the feed channel, so that sliding the pusher panel in said feed and return directions respectively increases and decreases a feed channel length between said closed back end and said open front end; and a guide panel affixed to the channel structure and extending below said bottom surface of the pusher device, the guide panel comprising a substantially planar guide surface;
the meat saw machine comprising a fence and a motorized saw blade disposed parallel to the fence; and
the guide panel configured to abut and slide along a straight horizontal edge of the tabletop surface of the meat saw machine extending parallel to a saw blade of the meat saw machine, while the bottom surface of the pusher device slides across the tabletop surface of the meat saw machine, to guide a cutting stroke of the pusher device, and the guide surface being oriented transversely with respect to the feed channel, wherein the pusher device may be slid with the bottom surface on and parallel to the tabletop surface such that the guide panel moves from abutting the straight horizontal edge to being spaced from the straight horizontal edge; and
the horizontal edge of the meat saw machine being an outermost edge of the machine.

2. The apparatus of claim 1, wherein the pusher device is detached from the tabletop surface.

3. The apparatus of claim 1, wherein the pusher device further comprises a backstop panel affixed to the channel structure, extending above the bottom of the feed channel, and disposed to prevent further movement of the pusher panel in the return direction when the pusher panel abuts the backstop panel, to define a home position of the pusher panel.

4. The apparatus of claim 3, wherein the pusher device further comprises a pusher mounting panel perpendicularly affixed to the pusher panel and slidingly connected to the feed channel to provide said sliding movement of the pusher panel in the feed and return directions.

5. The apparatus of claim 4, wherein a bottom surface of the pusher mounting panel is aligned approximately coplanar with a top surface of the backstop panel, wherein the pusher device further comprises an air vent formed in at least one of said panels to facilitate further movement of the pusher panel in the return direction when said pusher mounting panel bottom surface overlaps said backstop panel top surface to substantially enclose a volume of air having a length between the pusher panel and the backstop panel, a height between the bottom panel and the pusher mounting panel, and a width between the side panels, by relieving air pressure in said substantially enclosed volume of air.

6. The apparatus of claim 4, wherein the pusher device further comprises a pusher handle affixed to the pusher mounting panel to facilitate manual sliding movement of the pusher panel in the feed and return directions by a human operator.

7. The apparatus of claim 1, wherein said panels are composed of a stiff, nonstick, low density, solvent resistant panel material.

8. The apparatus of claim 7, the panel material being a polyethylene material.

9. The apparatus of claim 1, wherein the pusher device further comprises a pusher handle connected in fixed relation to the pusher panel to facilitate manual sliding movement of the pusher panel in the feed and return directions by a human operator.

10. The apparatus of claim 1, wherein the pusher device further comprises an advancing handle affixed to at least one of the side panels to facilitate the manual performance of a cutting stroke movement of the pusher device by a human operator.

11. The apparatus of claim 1 wherein the pusher device can be moved in a front-to-back direction parallel to the forward feed direction and in a side-to-side direction perpendicular to the forward feed direction while resting on the tabletop surface.

12. The apparatus of claim 1 wherein the guide panel extends below the tabletop surface to guide the cutting stroke of the pusher device.

13. The apparatus of claim 1 wherein the bottom surface is flat.

* * * * *